US012623578B2

(12) United States Patent
  Sotela

(10) Patent No.: US 12,623,578 B2
(45) Date of Patent: May 12, 2026

(54) PROTECTIVE COVER FOR THE SEATS AND UPHOLSTERY OF A MOTOR VEHICLE, COMPRISING EASILY WASHABLE ABSORBENT BAGS AND INTENDED FOR TRANSPORTING PETS

(71) Applicant: Antonio Morales Sotela, Zapopan (MX)

(72) Inventor: Antonio Morales Sotela, Zapopan (MX)

( * ) Notice: Subject to any disclaimer, the term of this patent is extended or adjusted under 35 U.S.C. 154(b) by 151 days.

(21) Appl. No.: 18/723,659

(22) PCT Filed: Jan. 6, 2023

(86) PCT No.: PCT/MX2023/050003
  § 371 (c)(1),
  (2) Date: Jun. 24, 2024

(87) PCT Pub. No.: WO2023/136715
  PCT Pub. Date: Jul. 20, 2023

(65) Prior Publication Data
  US 2025/0065786 A1    Feb. 27, 2025

(30) Foreign Application Priority Data
  Jan. 11, 2022    (MX) .................. MX/U/2022/000026

(51) Int. Cl.
  *B60N 2/60*        (2006.01)
  *A47C 31/11*       (2006.01)
(52) U.S. Cl.
  CPC ......... *B60N 2/6009* (2013.01); *B60N 2/6054* (2013.01); *A47C 31/11* (2013.01); *B60N 2/60* (2013.01); *B60N 2/6027* (2013.01)

(58) Field of Classification Search
  CPC .. B60N 2/6009; B60N 2/6027; B60N 2/6054; B60N 2/60; A47C 31/11
  See application file for complete search history.

(56) References Cited

U.S. PATENT DOCUMENTS 7,677,662 B2 * 3/2010 Thompson ........... B60N 2/6009
                                                       297/223
9,045,067 B2   6/2015 Long et al.
                      (Continued)

FOREIGN PATENT DOCUMENTS

DE        3238221 A1    4/1984
WO    2019215608 A1    11/2019

OTHER PUBLICATIONS

International Search Report, National Institute of Industrial Property, May 2, 2023.

*Primary Examiner* — Syed A Islam
(74) *Attorney, Agent, or Firm* — Bay State IP, LLC

(57)        ABSTRACT

The present Utility Model aims to improve the protective mats for seats and automotive upholstery for pet transportation on the seats, which are enhanced with a series of bags with absorbent cloths or material that trap spilled liquids. These bags have a zipper to place an absorbent cloth or material inside and remove it for washing when required. The attached bags are placed and adhered to the mat either fixedly with factory stitching or removable by means of hook and loop tape fasteners, as well as any other fastening method. The protective seat and automotive upholstery mat also features release buckle straps at its upper and lower ends to facilitate placement on seat headrests.

2 Claims, 10 Drawing Sheets

(56) References Cited

U.S. PATENT DOCUMENTS

| 2003/0085598 | A1 | 5/2003 | Monday |
| 2007/0194589 | A1 | 8/2007 | Aliev |
| 2009/0091165 | A1 | 4/2009 | Thompson |

* cited by examiner

PROTECTIVE COVER FOR THE SEATS AND UPHOLSTERY OF A MOTOR VEHICLE, COMPRISING EASILY WASHABLE ABSORBENT BAGS AND INTENDED FOR TRANSPORTING PETS

CROSS REFERENCE TO RELATED APPLICATION

This application is for entry into the U.S. National Phase from which priority is claimed under all applicable sections of Title 35 of the United States Code including, but not limited to, Sections 120, 363, and 365(c) to International Application No. PCT/MX2023/050003 filed on Jan. 6, 2023, and which in turn claims priority under 35 USC 119 to Mexican Patent Application No. MX/u/2022/000026 filed on Jan. 11, 2022, the contents of which are incorporated by reference herein in its entirety as part of the present application.

OBJECTIVE OF THE INVENTION

The present Utility Model aims to improve the protective mats for seats and upholstery in a car or truck, intended for transporting pets on the seats. Specifically, this mat is enhanced with a series of absorbent bags that trap spilled liquids, significantly reducing the risk of liquids spilling over the sides of the mats and contaminating part of the seats and upholstery.

BACKGROUND

Protective mats for car or truck seats have proven to be very useful, as they protect the seats and prevent pets from soiling them with their paws, fur, saliva, and body. The proposed protective mat arises because within this field, although there are mats made with several layers of fabric and some may have a layer capable of absorbing spilled liquids, they do not have a practical system of removable, easily washable cloths, strategically placed in areas where spills are most likely to accumulate, and on the edges where liquids are more likely to drip onto the sides of the seats, carpet, and upholstery, thus contaminating those areas.

The protective seat and upholstery mat with easily washable absorbent bags as proposed invention has been conceived to solve this problem to full satisfaction, as with the added bags, which can be fixed or removable, a highly absorbent and easily washable seat protective mat is obtained to maintain hygiene within the vehicle when transporting pets.

This improvement has a series of components clearly shown in the following description and in the accompanying drawings and photographs.

DETAILED DESCRIPTION OF THE INVENTION

Figure 1:
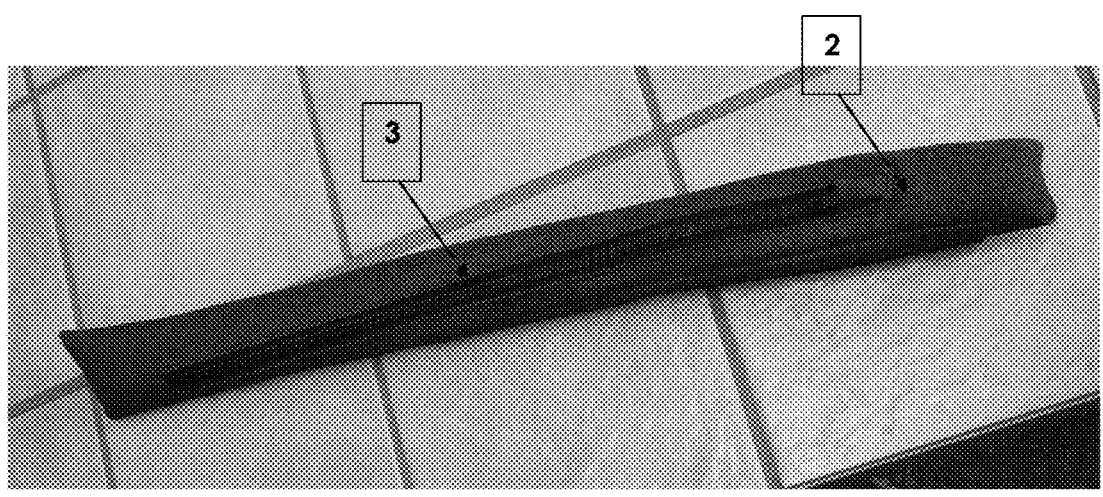
FIG. 1—is a perspective photograph of the bag (2) with the zipper (3) that allows placing the absorbent cloth or material inside.
Figure 2:
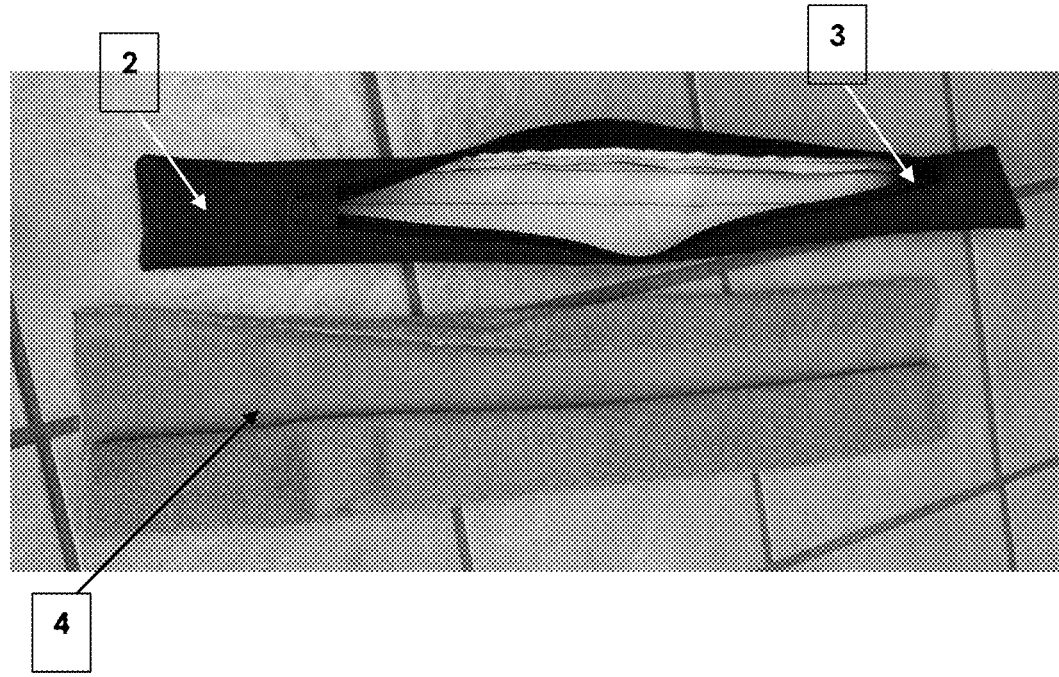
FIG. 2—is a perspective photograph of the bag (2) with the zipper (3) open to see the space inside where the absorbent cloth or material (4) is placed.
Figure 3:
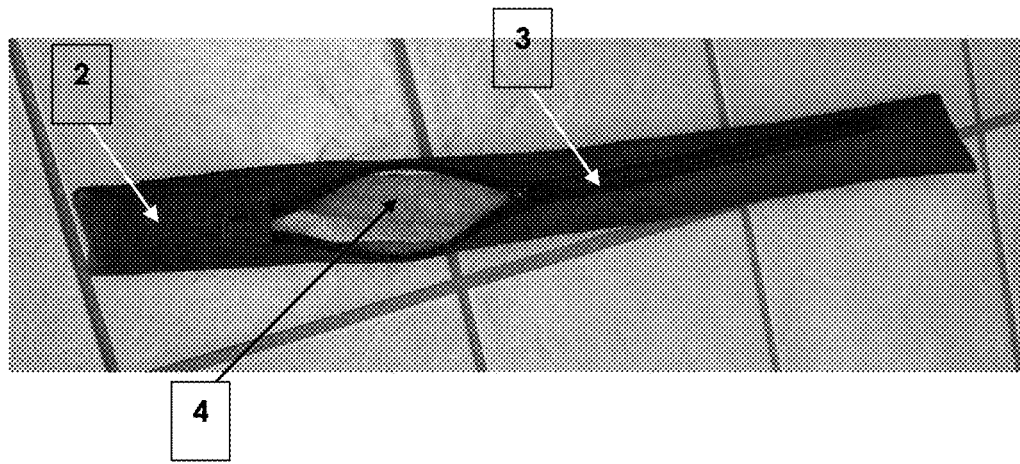
FIG. 3—is a perspective photograph of the bag (2) with the zipper (3) open to see the absorbent cloth or material (4) inside.
Figure 4:
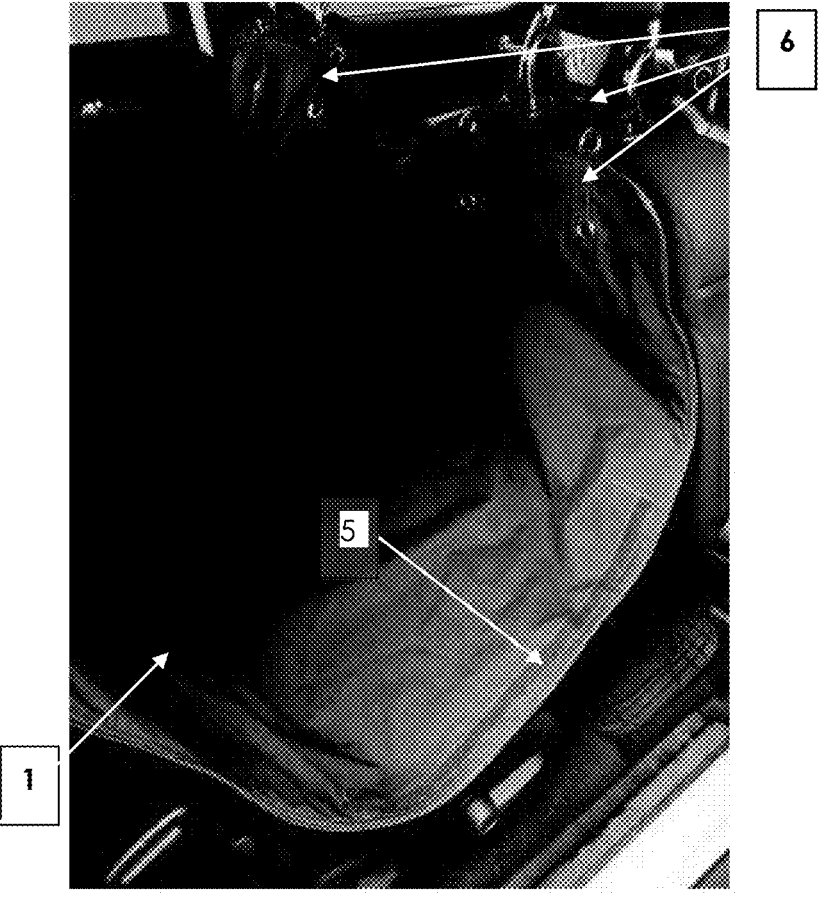
FIG. 4—is a perspective photograph of the protective seat and automotive upholstery mat (1) with the strap fastener (5) ready to attach the bag.
Figure 5:
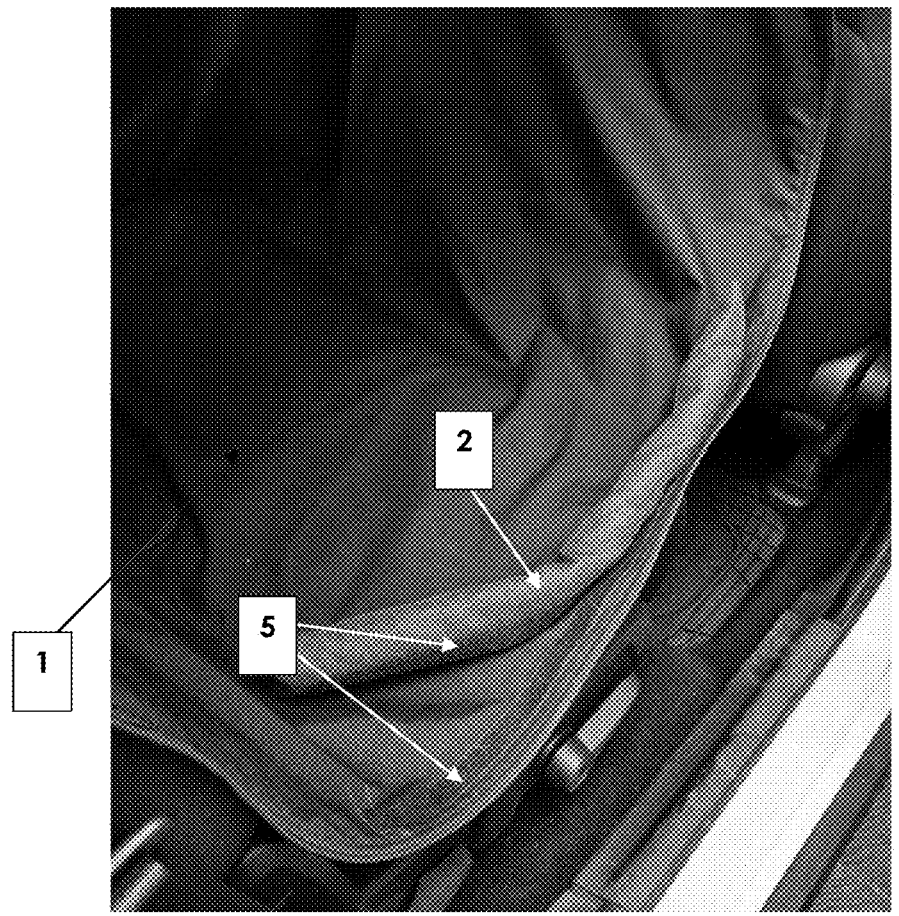
FIG. 5—is a perspective photograph of the protective seat and automotive upholstery mat (1) with the bag (2) being attached with the strap fastener (5).
Figure 6:
FIG. 6—is a perspective photograph of the protective seat and automotive upholstery mat (1) with the bag (2) already attached with the strap fastener (5).
Figure 7:
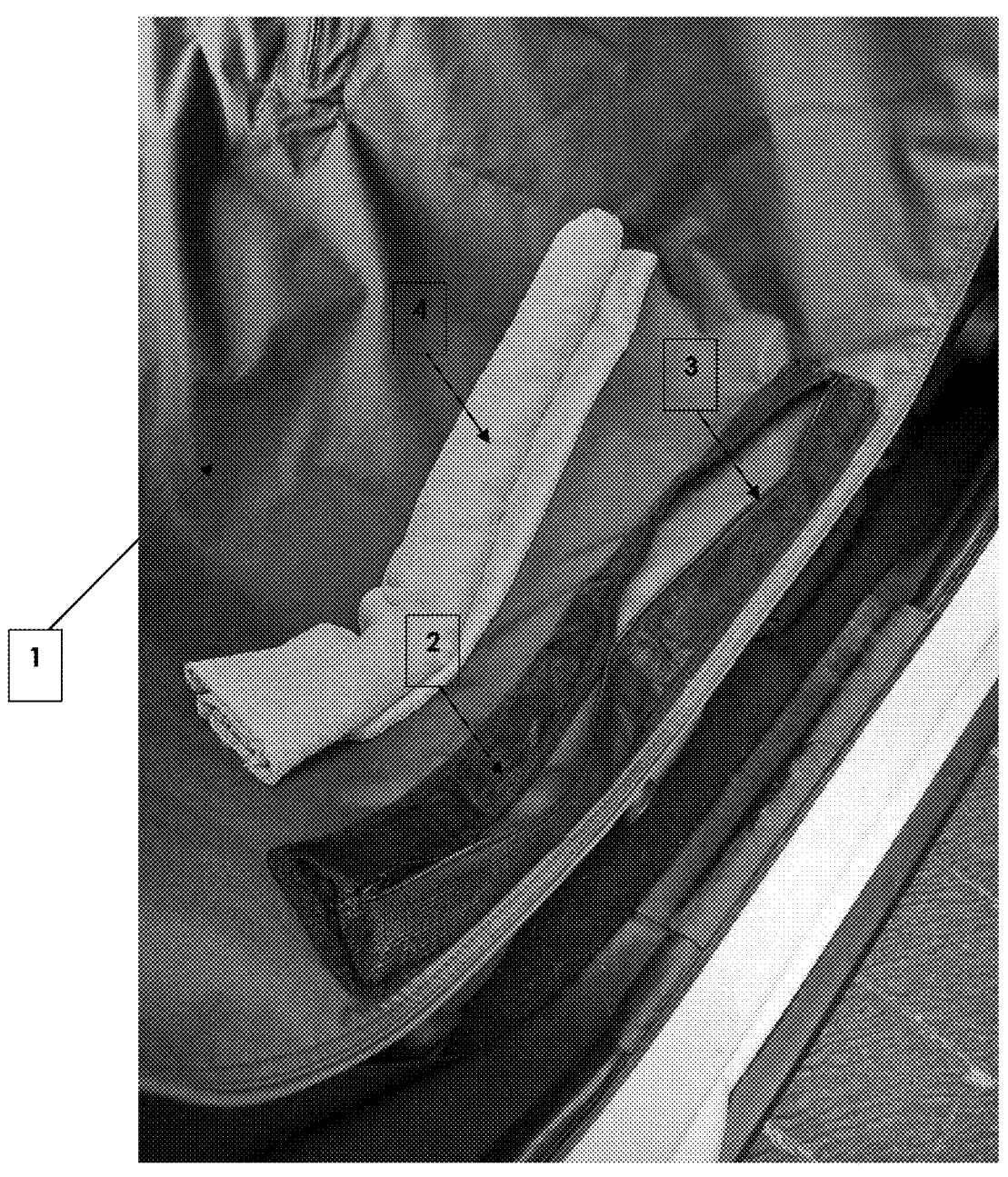
FIG. 7—is a perspective photograph of the protective seat and automotive upholstery mat (1) with the bag (2) firmly attached and the zipper (3) open to place the absorbent cloth or material (4) inside.
Figure 8:
FIG. 8—is a perspective photograph of the protective seat and automotive upholstery mat (1) with the bag (2) firmly attached and the absorbent cloth or material (4) inside.
Figure 9:
FIG. 9—is a perspective photograph of the protective seat and automotive upholstery mat (1) with the bags (2) firmly attached and the absorbent cloth or material (4) inside; already placed on the headrests of the car seats with the straps and quick-release buckles (6).
Figure 10:
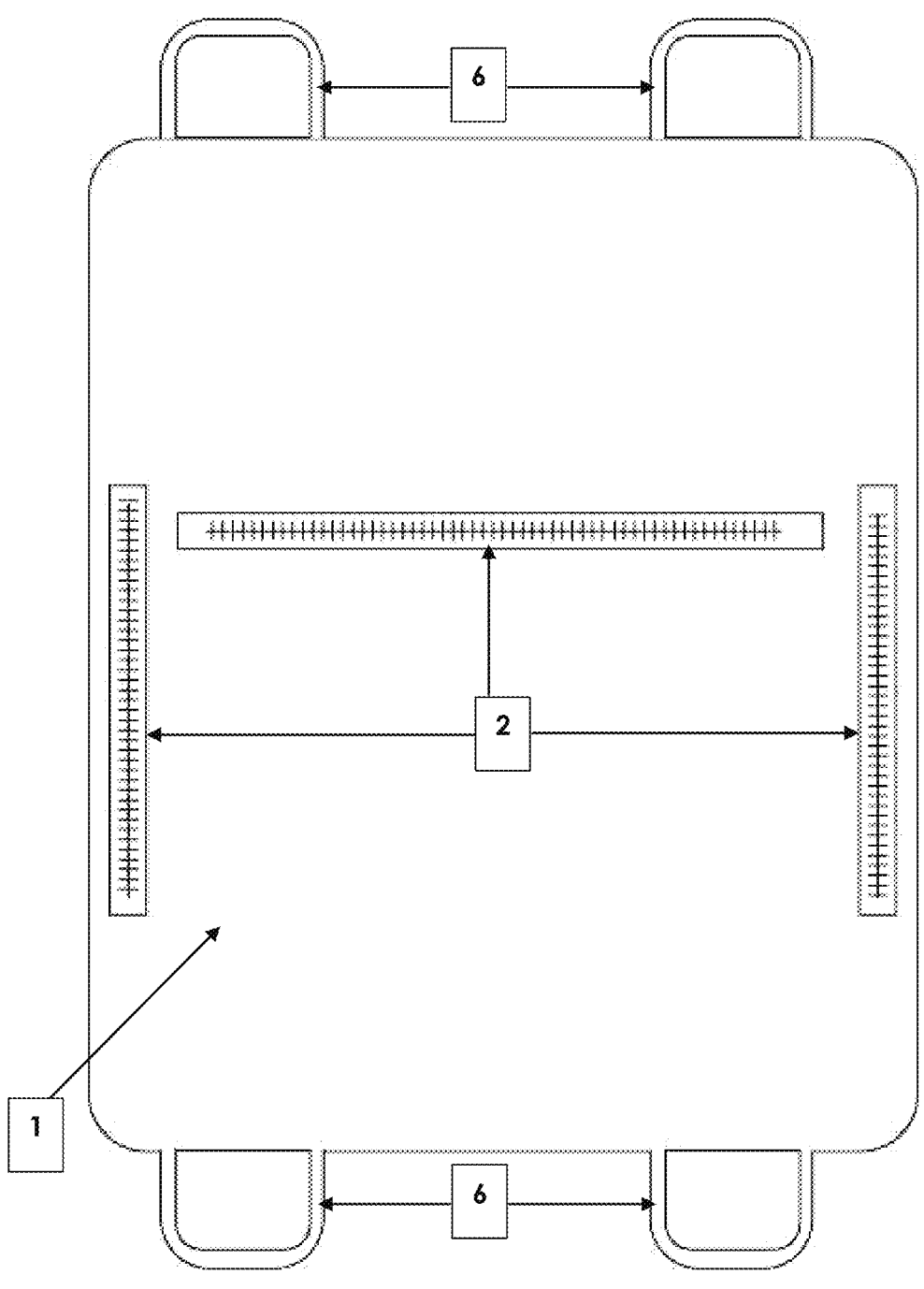
FIG. 10—is a front view of the protective seat and automotive upholstery mat (1) with the attached bags (2).
Figure 11:
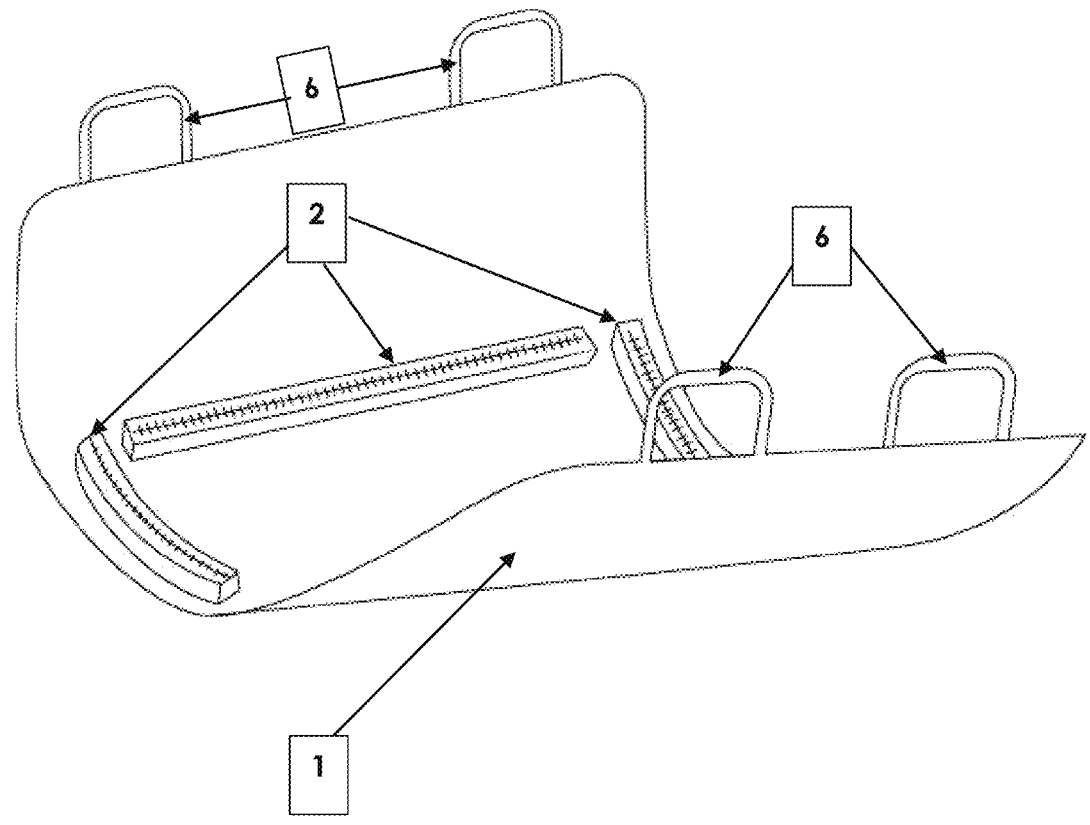
FIG. 11—is a general perspective view of the protective seat and automotive upholstery mat (1) with the attached bags (2) to be installed inside the car.
Figure 12:
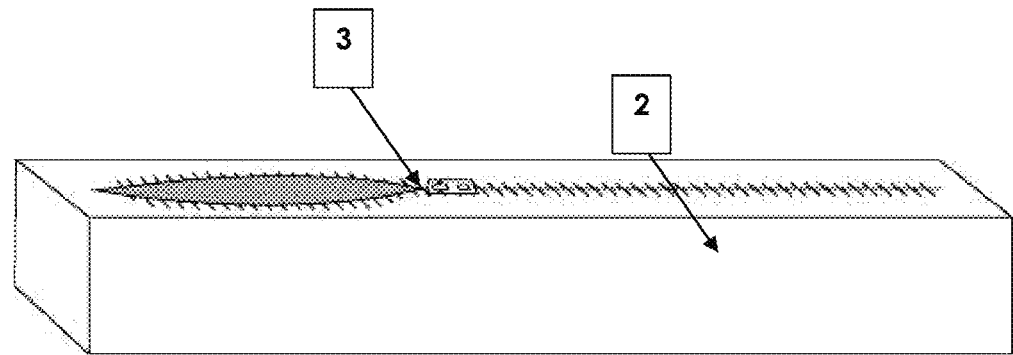
FIG. 12—is a side view of the bag (2) with its zipper (3).
Figure 13:
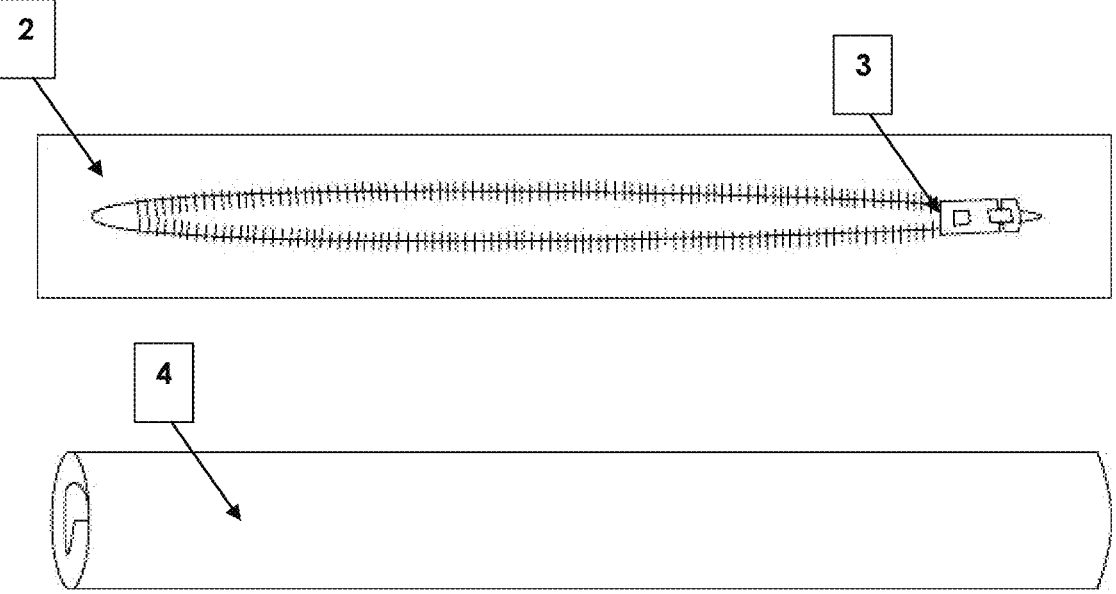
FIG. 13—is a front view of the bag (2) with its zipper (3) open and the absorbent cloth or material (4) before being placed inside.

The utility model referred to in this invention is an improvement on protective mats for seats and automotive upholstery for transporting pets on the seats; specifically, a mat comprising first and second opposite lateral edges; a front edge extending between the first lateral edge and the second lateral edge; a rear edge extending between the first lateral edge and the second lateral edge, said rear edge being placed opposite said front edge, a distance between the front edge and the rear edge defining a depth of the cover; adjustable straps with release buckles to adjust between two seat headrests, characterized by a series of bags with cloths or absorbent material that trap spilled liquids, significantly reducing the risk of liquids spilling over the sides of the mats and contaminating part of the seats and upholstery.

The improvement in the protective seat and automotive upholstery mat (1) is characterized by a series of attached bags (2), which have a zipper (3) to place an absorbent cloth or material (4) inside and remove it for washing when required.

The attached bags (2) can be made of fabric or mesh to allow liquids to pass through, and they are placed and attached to the mat either fixedly with factory stitching or removably using hook and loop tape fasteners (5), or any other method of attachment. The protective seat and automotive upholstery mat (1) also features straps with release buckles (6) at its upper and lower ends to facilitate placement on the seat headrests.

The absorbent cloth or material (4) can be made of fabric, microfiber, sponge, foam rubber, or any material suitable for trapping and retaining liquids and easily washable.

What is claimed is:

1. A protective seat and automotive upholstery mat for pet transportation; comprising first and second opposite lateral edges; a front edge extending between the first lateral edge and the second lateral edge; a rear edge extending between the first lateral edge and the second lateral edge, said rear edge being placed opposite said front edge, a distance between the front edge and the rear edge defining a depth of 5 the cover; adjustable straps with release buckles to adjust between two seat headrests; characterized by a series of bags attached to its surface, each of which is made of fabric or mesh, to allow the passage of liquids into its interior, and has a zipper to place an absorbent cloth or material inside to trap 10 and retain liquids.

2. The protective seat and automotive upholstery mat for pet transportation of claim 1, characterized in that the attached bags are fixed to the mat with factory stitching or removably with hook and loop tape fasteners or any other 15 method of attachment, to be placed in various positions.

* * * * *